Figure 1:
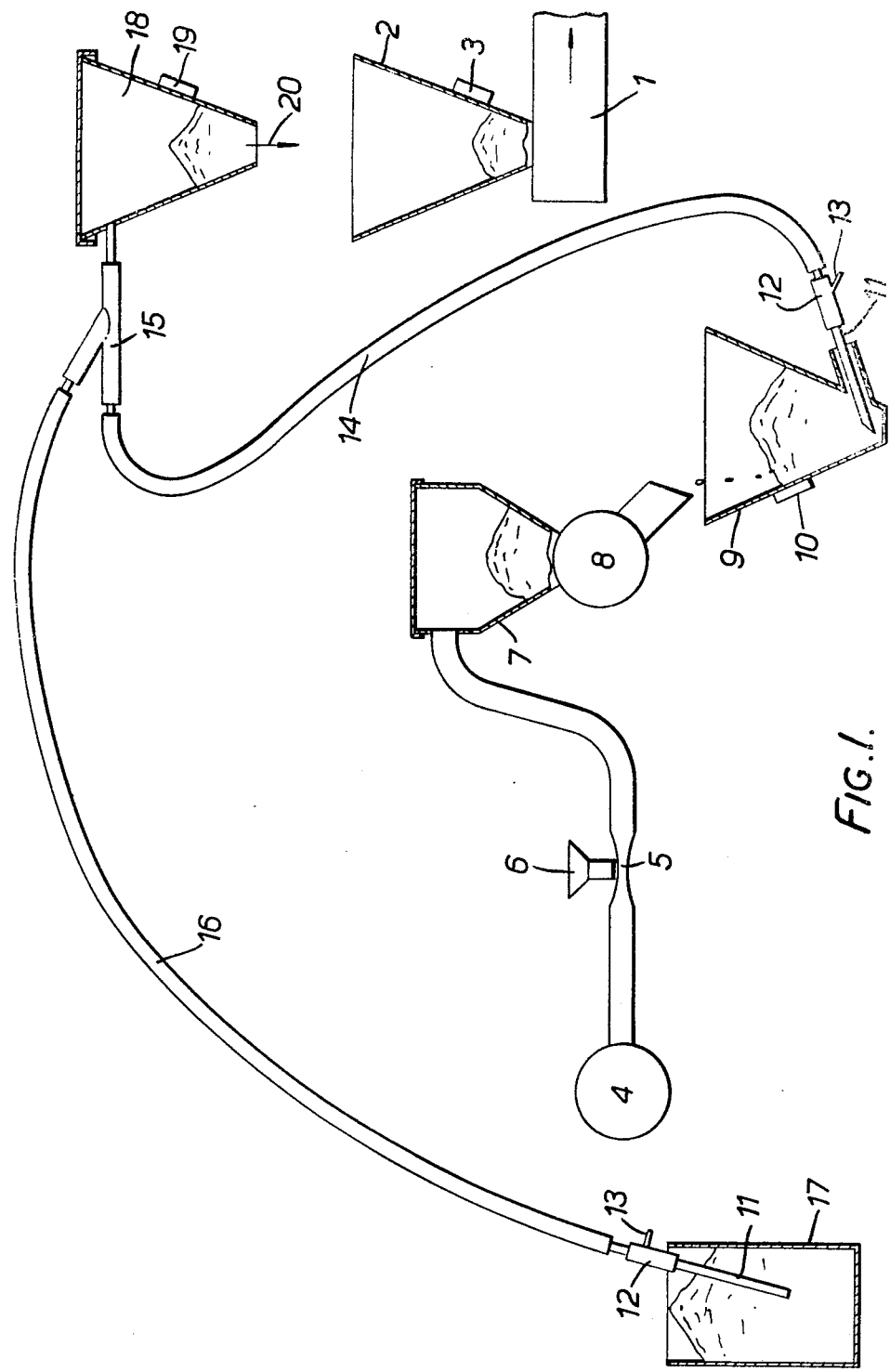

United States Patent [19]
Ballinger et al.

[11] 3,941,318
[45] Mar. 2, 1976

[54] SYSTEMS FOR THE FEEDING OF PLASTICS MATERIALS TO PLASTICS WORKING MACHINES

[75] Inventors: Maurice Gordon Ballinger, Stroud; Raymond Mitchell Oakerbee, Slough, both of England

[73] Assignees: S.T.B. Engineering Limited, Stroud; Oaktree Equipment Limited, Slough, both of England

[22] Filed: Feb. 20, 1974

[21] Appl. No.: 444,243

[30] Foreign Application Priority Data
Feb. 22, 1973 United Kingdom............... 8843/73

[52] U.S. Cl. ... 241/101.4; 241/101.6; 241/DIG. 28; 425/217
[51] Int. Cl.² ........................................ B02C 19/12
[58] Field of Search............. 241/101.4, 101.6, 235, 241/236, DIG. 28; 302/25; 425/217

[56] References Cited
UNITED STATES PATENTS

| 2,673,125 | 3/1954 | Squire.................................. 302/25 |
| 3,000,055 | 9/1961 | Schlicksupp................ 241/DIG. 28 |
| 3,553,772 | 1/1971 | Premo............................. 425/217 X |
| 3,797,761 | 3/1974 | Neil............................ 241/DIG. 28 |

*Primary Examiner*—Granville Y. Custer, Jr.
*Assistant Examiner*—E. F. Desmond
*Attorney, Agent, or Firm*—Haseltine, Lake & Waters

[57] ABSTRACT

A system for supplying plastics material to a plastics working machine, such as a blow moulding machine comprising automatic means for removing waste from a plastics working machine, a conveyor for feeding the waste to a comminuting machine, a hopper for comminuted plastics waste, and a conveying mechanism for mixing and conveying the plastics waste and fresh plastics material to a further hopper that is arranged to supply the inlet of the plastics working machine.

10 Claims, 2 Drawing Figures

SYSTEMS FOR THE FEEDING OF PLASTICS MATERIALS TO PLASTICS WORKING MACHINES

This invention relates to systems for the feeding of plastics materials to plastics working machines such as, purely by example, blow moulding machines. A certain amount of waste of the plastics material takes place with all kinds of plastics working machines and the normal practice with scraps, sprues, faulty mouldings and the like is to collect them, bring them to a workable size by chipping or the like and subsequently to mix the small chips or the like with fresh plastics material that is to be supplied to the plastics working machine. This slavage operation is undertaken as a special job whenever required and involves a strong possibility of contamination and some loss of the salvaged plastics scrap and the like. An object of the present invention is to overcome, or at least reduce, the disadvantages of such known plastics waste salvaging techniques by providing a substantially automatic system that will give improved material and processing efficiency. The advantages of employing a system in accordance with the invention are particularly marked with custom moulding operations where articles or components are produced in a plurality of different material grades and/or colors.

According to the invention, there is provided a system for feeding plastics materials to at least one plastics working machine, wherein the system comprises automatic means for removing plastics waste from the or each working machine, a conveyor for feeding the collected waste to a grinding, chipping or other comminuting machine, a hopper or other container for comminuted plastics waste produced by the comminuting machine, and a conveying mechanism for mixing and conveying the comminuted plastics waste and fresh plastics material to at least one further hopper or other container that is arranged to supply an inlet of the or each plastics working machine with mixed plastics waste and fresh plastics material.

Figure 2:
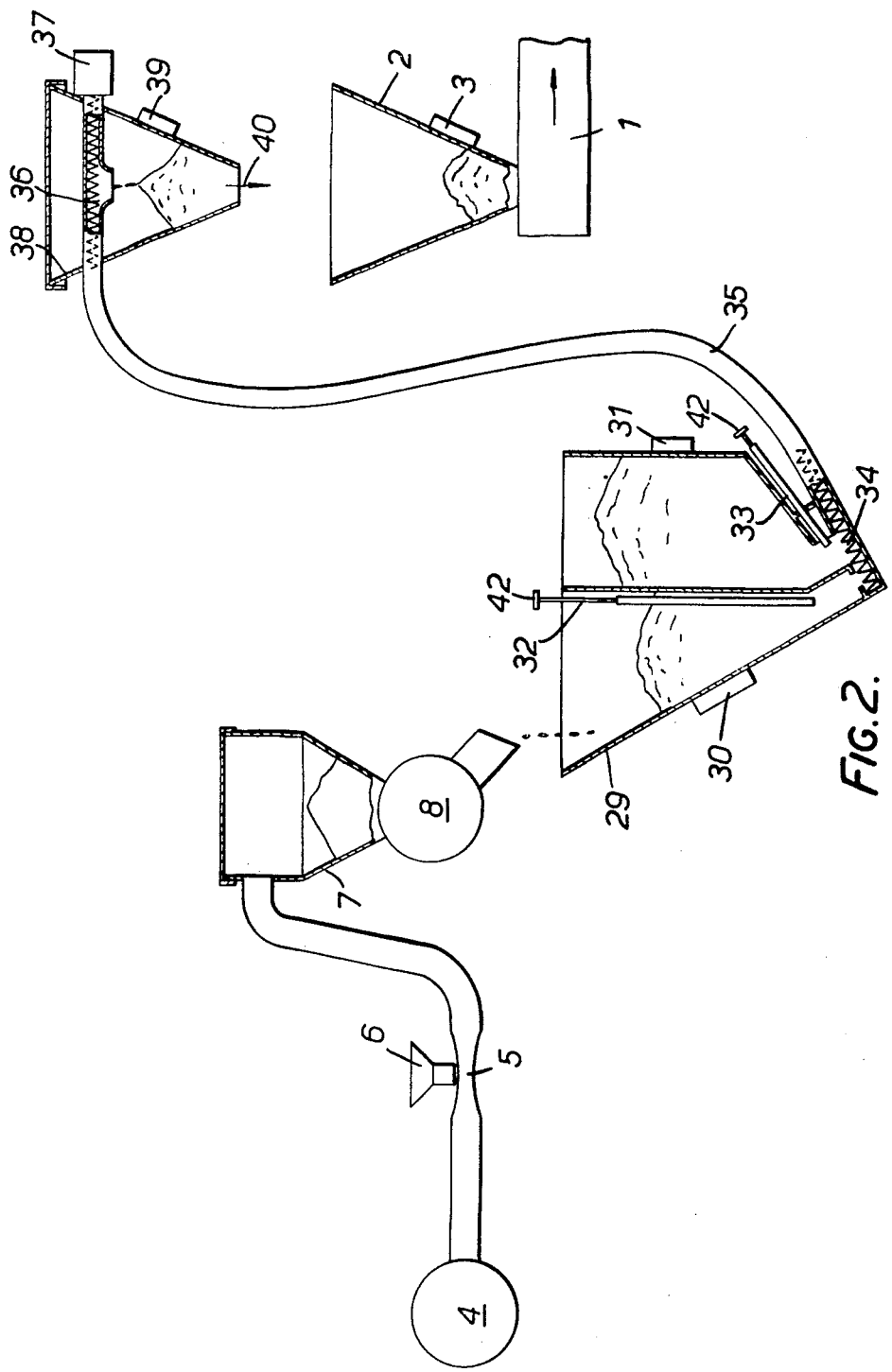

For a better understanding of the invention, and to show how the same may be carried into effect, reference will now be made, by way of example, to the accompanying drawings, in which:

FIG. 1 is a diagrammatic sketch illustrating the use of a system in accordance with the invention in feeding plastics materials to a plastics moulding machine, and FIG. 2 is a diagrammatic sketch of another embodiment of a system according to the invention.

Referring to FIG. 1, a plastics moulding machine has a plastics material inlet region 1 provided with a hopper 2. The hopper is furnished with a level indicator or switch 3. Means, which may be known per se, is provided for automatically removing plastics waste, such as scraps, sprues, faulty mouldings and the like, from the plastics working machine and, in the example which is being described, an air conveyor carries the collected plastics waste to a hopper 7. The air conveyor comprises a low pressure impeller fan 4 that feeds an air stream to a venturi unit 5 having an inlet 6 for plastics waste collected by the automatic removing means (not shown) that has been mentioned above. A stream of air containing the entrained plastics waste passes through ducting to an inlet of the hopper 7 which hopper is vented in such a way that the entraining air supplied by the fan 4 can escape back to the atmosphere. The fan 4, venturi unit 5 and the associated ducting are of such a size as to be able to deal with a range of different sizes of plastics waste but it is emphasized that an alternative form of conveyor could be employed to that which has been described. The conveyor could, for example, take the form of a moving conveyor belt or other mechanical conveyor having a region arranged to receive the collected plastics waste and a delivery region in communication with an inlet of the hopper 7.

The hopper 7 feeds a plastics grinding machine 8 which may be of a known construction that is arranged to divide the plastics waste into granules, chips or other comminuted particles. The granulated plastics waste is fed from the grinding machine 8 to a hopper or other container 9, such feeding preferably taking place, as illustrated, under the action of gravity but it being possible to provide a feeding conveyor in any particular installation in which a gravity feed is not convenient. The hopper or other container 9 is fitted with a level switch 10 arranged to control the grinding machine 8 in such a way as positively to prevent overfilling of the hopper or other container 9.

A probe tube 11 is entered in the granular waste material in the hopper or other container 9, said probe tube 11 forming part of a pneumatic conveying unit 12 comprising a venturi tube with an air inlet directed at an acute angle towards the outlet end thereof, so that suction is generated at the inlet end and material is drawn through the unit 12. The compressed air then carries the material through the pipe. The pneumatic conveying unit 12 is fed with air under pressure from an inlet 13 and a stream of air containing plastics waste granules entrained from the hopper or other container 9 passes along a duct 14 to one branch limb of a Y-shaped pipe connection 15 whose other branch limb is connected to a duct 16 provided, at its far end, with a further pneumatic conveying unit 12 having a probe tube 11 which is entered in fresh granular or other comminuted plastics material contained in, for example, a sack or bag 17. Clearly, it is not essential to use sacks or bags and the fresh granular plastics material may be fed to the duct 16 from, for example, a bulk storage silo or other bulk storage container. The duct 16 may, if required, be branched and any appropriate number of the pneumatic conveying units 12 may be employed.

A combined stream of air from both the duct 14 and the duct 16 is fed from the third limb of the pipe connection 15 into a small sub-hopper 18 which, like the hopper 7, is vented so as to allow the conveying air from the ducts 14 and 16 to escape back to the atmosphere. The sub-hopper 18 is fitted with a level indicator or switch 19 that is arranged to control the supply of granular plastics material through the two ducts 14 and 16 so as to prevent overfilling. It will be seen that fresh granular plastics material and granulated recovered waste plastics material are mixed together in the Y-shaped pipe connector 15 immediately before entering the sub-hopper 18, the granulated material collected in the sub-hopper 18 thus being substantially homogeneous as regards its "fresh" and "recovered waste" constituents.

The sub-hopper 18 has an outlet 20 from which the thoroughly mixed granular plastics material is fed, preferably under gravity, to the hopper 2 that communicates with the plastics material inlet region 1 of the moulding machine. It will be seen that plastics waste produced by the moulding machine is subject to recovery in a closed loop system which automatically brings the waste material to a condition suitable for re-working and automatically produces a homogeneous mixture of the recovered waste with fresh plastics material that is to be moulded into articles or components. Once initial controls for the pneumatic conveying units 12 and other controls of the system have been set, the whole system will work substantially automatically with any predetermined plastics material and rate of production of articles and/or components and will only need a minimum of supervision and periodic adjustment.

Referring to FIG. 2, the system shown therein also includes a fan 4, venturi unit 5, waste materials inlet 6, hopper 7 and comminuting machine 8. The system supplies a hopper 2 of an inlet region of a plastics moulding machine. These parts of the system are identical to the corresponding parts of the system of FIG. 1.

In the system of FIG. 2, a hopper 29 is divided into two halves, which have variable cross-section outlets at the bottom, controlled by sliding gates 32 and 33. The gates are manually operable by handles 42. However, other gate mechanisms could be used, and remote control could be provided.

The comminuting machine 8 feeds one half of the hopper 29, and the other half is kept full of fresh material. The variable outlets are adjacent and empty into a conveyor, which is a flexible Archimedean screw 34 rotatable within a pipe 35. Adjustment of the gates 32 and 33 causes adjustment of the total volume and ratio between the waste and fresh material.

The other end of the pipe 35 of the conveyor is located within a hopper 38 and the conveyor feeds the mixed material thereto through a port 36 in the wall of the pipe 35. The Archimedean screw is driven by a motor 37. The hopper has an outlet 40.

The speed of the conveyors are controlled by level-sensing switches 30, 31 and 39, as in the previous embodiment.

The system that has been diagrammatically illustrated in the accompanying drawing is a simple system feeding plastics material to only a single plastics moulding machine. It will be realized that it is within the scope of the invention to employ a more complicated system in which a plurality of plastics working machines are fed with granular or other comminuted plastics material a proportion of which is automatically recovered plastics waste from those machines. Although the plastics working machines will usually be blow or other moulding machines, the system can be applied to feeding plastics materials to other forms of plastics working machine.

We claim:

1. A system for feeding plastics material to the inlet of at least one plastics working machine, said system comprising automatic means for removing plastics waste from the plastics working machine, a comminuting machine, a conveyor for feeding collected waste to said comminuting machine, a conveying mechanism for mixing the comminuted plastics waste and fresh plastics material, and container means for receiving the mixture from said conveying mechanism and for supplying the plastics working machine with the mixed plastics waste and fresh plastics material, said conveying mechanism comprising a first probe tube, a first container for comminuted plastics waste, said first probe tube projecting into said first container, a first venturi having one inlet connected to said probe tube and a second inlet connected to a source of air under pressure, said first venturi having an outlet, a hose connected to the outlet of said first venturi, a union connected to said hose, said conveying mechanism further comprising a second probe tube, a second container for fresh plastics material, said second probe tube projecting into said second container, a second venturi connected to said second probe tube and to a source of air under pressure, said second venturi being connected to said union, said union being coupled to said container means for supplying the mixed plastics waste and fresh plastics material to the inlet of the plastics working machine.

2. A system according to claim 1, wherein said conveyor for feeding the collected waste to the comminuting machine is a pneumatic conveyor.

3. A system according to claim 1, wherein said conveyor for feeding the collected waste to the comminuting machine is a mechanical conveyor.

4. A system according to claim 1, wherein said first container for comminuted plastics waste, said container means and the inlet of said plastics working machine are each provided with a level sensing mechanism operatively connected to the conveyor and the conveying mechanism to prevent overfilling.

5. A system for feeding plastics material to at least one plastics working machine, said system comprising automatic means for removing plastics waste from the plastics working machine, a conveyor for receiving collected waste from the automatic removing means, a comminuting machine connected to the conveyor for receiving the waste therefrom and for producing comminuted plastics waste, container means for receiving comminuted plastics waste produced by the comminuting machine, and a conveying mechanism for mixing and conveying the comminuted plastics waste and fresh plastics material to an inlet of the plastics working machine to supply that inlet with mixed plastics waste and fresh plastics material, said conveying mechanism comprising a flexible Archimedian screw, said container means comprising a hopper divided into two parts, each part having a variable outlet in communication with said conveying mechanism containing the Archimedian screw.

6. A system according to claim 5 comprising a further container arranged to supply the inlet of the plastics working machine with mixed plastics waste and fresh plastics material, said further container being connected to the end of said conveying mechanism that is remote from the container means.

7. A system according to claim 5, wherein said container means for comminuted plastics waste and the inlet of the plastics working machine are each provided with a level sensing mechanism operatively connected to the conveyor and to the conveying mechanism.

8. A system according to claim 5 comprising manually manipulable means for controlling the sizes of the outlets of said parts of said hopper, said manually manipulable means being disposed above the flexible Archimedian screw.

9. A system for feeding plastics material to at least one plastics working machine, said system comprising automatic means for removing plastics waste from the plastics working machine, a conveyor for receiving collected waste from the automatic removing means, a comminuting machine connected to the conveyor for receiving the waste therefrom and for producing comminuted plastics waste, container means for receiving comminuted plastics waste produced by the comminuting machine, and a conveying mechanism for mixing and conveying the comminuted plastics waste and fresh plastics material to an inlet of the plastics working machine to supply that inlet with mixed plastics waste and fresh plastics material, said conveying mechanism comprising a flexible Archimedian screw, a conduit connected to said Archimedian screw for carrying the mixture of waste and fresh plastics material, said conduit having an end remote from said screw with a discharge outlet thereat, and a second Archmedian screw in said conduit at said discharge outlet.

10. A system according to claim 9, wherein said container means comprises a hopper divided into two parts, each part having a variable outlet leading into said first Archimedian screw, and means disposed above said first Archimedian screw for controlling the sizes of said outlets.

* * * * *